(12) United States Patent  
Hu

(10) Patent No.: US 12,031,938 B2
(45) Date of Patent: Jul. 9, 2024

(54) GAMMA-IRRADIATION-COMPATIBLE REFERENCE GEL

(71) Applicant: Rosemount Inc., Shakopee, MN (US)

(72) Inventor: Jinbo Hu, Minnetonka, MN (US)

(73) Assignee: Rosemount Inc., Shakopee, MN (US)

( * ) Notice: Subject to any disclaimer, the term of this patent is extended or adjusted under 35 U.S.C. 154(b) by 546 days.

(21) Appl. No.: 17/135,098

(22) Filed: Dec. 28, 2020

(65) Prior Publication Data

US 2022/0205946 A1 Jun. 30, 2022

(51) Int. Cl.

| | |
|---|---|
| B01L 3/00 | (2006.01) |
| B01F 23/00 | (2022.01) |
| B01F 23/41 | (2022.01) |
| B01F 101/23 | (2022.01) |
| B23Q 17/24 | (2006.01) |
| C08J 3/075 | (2006.01) |
| C08K 3/16 | (2006.01) |
| C08K 3/22 | (2006.01) |
| C08K 3/32 | (2006.01) |
| C12Q 1/18 | (2006.01) |
| G01N 21/64 | (2006.01) |
| G01N 27/411 | (2006.01) |
| G01N 33/50 | (2006.01) |

(52) U.S. Cl.
CPC ......... *G01N 27/4117* (2013.01); *C08J 3/075* (2013.01); *C08K 3/16* (2013.01); *C08K 3/22* (2013.01); *C08K 3/32* (2013.01); *C08K 2003/329* (2013.01); *C08K 2201/014* (2013.01)

(58) Field of Classification Search
CPC ........ G01N 27/4117; G01N 27/4035; G01N 27/4167; G01N 27/4168; G01N 27/301; G01N 27/416; G01N 11/00; C08J 3/075; C08J 2371/02; C08K 3/16; C08K 3/22; C08K 3/32; C08K 2003/329; C08K 2201/014; C08K 5/098
See application file for complete search history.

(56) References Cited

U.S. PATENT DOCUMENTS

| | | |
|---|---|---|
| 4,797,188 A | 1/1989 | Tomita |
| 7,704,359 B2 | 4/2010 | Sovrano et al. |
| 9,134,266 B2 | 9/2015 | Thrier |

(Continued)

FOREIGN PATENT DOCUMENTS

| | | |
|---|---|---|
| CN | 1357105 A | 7/2002 |
| CN | 1595133 A | 3/2005 |

(Continued)

OTHER PUBLICATIONS

Wang, Ke, et al. "Preliminary assessment of the safety evaluation of novel pH-sensitive hydrogel." European journal of pharmaceutics and biopharmaceutics 82.2 (2012): 332-339. (Year: 2012).*

(Continued)

*Primary Examiner* — Jennifer Wecker
*Assistant Examiner* — Oyeleye Alexander Alabi
(74) *Attorney, Agent, or Firm* — Westman, Champlin & Koehler, P.A.; Z. Peter Sawicki

(57) ABSTRACT

A gel for use in a pH or an ORP sensor, components of the gel comprising water, a reference electrolyte salt, a buffering system for adjusting pH of the gel, and a polymeric gelling agent, and the gel does not degrade under gamma irradiation.

10 Claims, 1 Drawing Sheet

(56) References Cited

U.S. PATENT DOCUMENTS

| | | |
|---|---|---|
| 2005/0133369 A1 | 6/2005 | Sovrano et al. |
| 2008/0149482 A1 | 6/2008 | Marett |
| 2009/0050477 A1 | 2/2009 | Catt et al. |
| 2009/0054545 A1 | 2/2009 | Muratoglu et al. |
| 2010/0155239 A1* | 6/2010 | Sorensen ........... G01N 33/4925 204/406 |
| 2013/0270125 A1* | 10/2013 | Lobbert ............. G01N 27/4035 205/793 |
| 2016/0178556 A1 | 6/2016 | Hanko et al. |
| 2017/0176371 A1 | 6/2017 | Hanko et al. |
| 2020/0057043 A1 | 2/2020 | Carlson et al. |

FOREIGN PATENT DOCUMENTS

| | | |
|---|---|---|
| CN | 101915794 A | 12/2010 |
| CN | 103376285 A | 10/2013 |
| CN | 107949786 A | 4/2018 |
| CN | 109556941 A | 4/2019 |
| DE | 102011089707 A1 | 9/2012 |
| DE | 102014113260 A1 | 3/2016 |
| JP | H03-296657 A | 12/1991 |
| JP | H08-136496 A | 5/1996 |
| JP | 2000-511631 A | 9/2000 |
| JP | 2001-343351 A | 12/2001 |
| JP | 2015-200646 A | 11/2015 |
| WO | 93/04360 A1 | 3/1993 |
| WO | 2011/043008 A1 | 4/2011 |
| WO | 2016/173701 A1 | 11/2016 |

OTHER PUBLICATIONS

"Poly(ethylene glycol)" https://www.sigmaaldrich.com/US/en/product/aldrich/202436 (Year: 2020).*

International Search Report and Written Opinion issued for PCT/US2021/052031, dated Jan. 24, 2022.

International Search Report and Written Opinion issued for PCT/US2021/058619, dated Feb. 28, 2022.

Office Action issued for CN patent application Serial No. 202110284401.4, dated Nov. 29, 2023 with English Translation.

Baird, J.A. et al. "Effect of Molecular Weight, Temperatures, and Additives on the Moisture Sorption Properties of Polyethylene Glycol" Journal of Pharmaceutical Sciences (2010) vol. 99, No. 1.

Notice of Reasons for Rejection issued for related JP patent application Serial No. 2023-528259, dated Mar. 19, 2024, and English Translation.

Ishikawa, T., "Stress-Optical Coefficient of Poly(ethylene oxide) and Poly(propylene oxide) Networks. Measurements", Polymer Journal, 1973, vol. 5, No. 2, pp. 227-229, https://doi.org/10.1295/polymj.5.227 (document showing well-known technology).

Notice of Reasons for Rejection issued for related JP patent application Serial No. 2023-539835, dated Apr. 23, 2024, and English Translation.

* cited by examiner

GAMMA-IRRADIATION-COMPATIBLE REFERENCE GEL

This application relates to a viscous, biocompatible, and gamma irradiation stable reference gel that can be used in pH and Oxidation-Reduction Potential (ORP) sensors.

pH sensors that use a liquid reference electrolyte in the reference electrode can suffer from an undesired response fluctuation when exposed to positive process pressure. This behavior is illustrated in FIG. 1, where 2 pH sensors with reference electrodes filled with liquid reference solutions were exposed to various process pressures ranging from 0-90 psi. As process pressure was ramped up from 0 to 30 psi, the two pH sensors started to exhibit response fluctuations. Significant response fluctuations up to 1 pH unit were observed when the process pressure reached 90 psi. Such fluctuations cause significant measurement errors and are not acceptable.

This undesired pressure sensitivity is caused by disturbed ion diffusion from the reference electrode into the process through the reference junction, thus leading to an unstable reference liquid junction potential and subsequently, erratic sensor response. As a result, this problem prevents the use of pH sensors filled with liquid reference electrolyte in downstream pharmaceutical applications where the process pressure can vary and reach up to 90 psi.

One approach to address this problem is to apply an internal pressure to the sensor reference electrode, thus cancelling out the effect of external process pressure by pushing out reference electrolyte through the junction. Several U.S. patent references describe the design and manufacturing process of introducing the internal pressure into the reference electrode including U.S. Pat. No. 7,704,359, US 2017/0176371, and U.S. Pat. No. 9,134,266. The minimum required sensor internal pressure depends on the external process pressure and sensor reference fill electrolyte, and can be extremely high when the external process pressure is high (e.g., 90 psi). This high internal reference chamber pressure requirement may lead to challenges in mechanical design, validation, and subsequent development of manufacturing processes.

Another approach to address this problem is to use a highly viscous reference electrolyte to replace the water-like low-viscosity reference solution in the reference electrode. The high viscosity of the gel alleviates the disturbance of the critical ion diffusion process by external flow and pressure fluctuations. As a result, it can lead to reduced minimum required pressure within the reference electrode, or even no requirement for internal reference electrode pressure. There are several viscous reference gel formulations that rely on silica, cellulose and polysaccharides as the gelling agents. These gels are widely used in industrial pH sensors but are not stable upon Gamma irradiation. It was observed that Gamma irradiation can break down these gels by changing their physical and chemical properties, leading to significantly reduced gel viscosities and change in pH values. As a result, the traditional reference gels are not suitable to be used in single-use pharmaceutical pH sensors, where Gamma irradiation is a standard process used for sterilization.

SUMMARY

This application includes a gel for use in a pH or an ORP sensor wherein components of the gel comprise water, a reference electrolyte salt, a buffering system for adjusting pH of the gel, and a polymeric gelling agent, and the gel does not degrade under gamma irradiation.

In another embodiment the polymeric gelling agent comprises polyethylene glycol having a molecular weight of 15,000 or less.

In another embodiment a viscosity of the gel is adjusted by changing the concentration of the gelling agent or the molecular weight of the gelling agent or both.

In another embodiment the buffering system comprises a phosphate or carbonate-based buffer.

In another embodiment the reference electrolyte salt comprises potassium chloride with a concentration from 0.01 M to saturation or lithium acetate with a concentration from 0.01 M to saturation.

In another embodiment the gelling agent concentration comprises approximately 2 to 90 wt. %.

In another embodiment the components of the gel are biocompatible.

In another embodiment the polymeric gelling agent comprises polyethylene glycol derivatives such as methoxypolyethylene glycol and poly(ethylene glycol) methyl ether methacrylate.

In an alternative embodiment this disclosure includes a pH sensor comprising a housing and a gel comprising a reference electrolyte salt, a buffering system for adjusting pH of the gel, and a polymeric gelling agent, and the gel does not degrade under gamma irradiation within the housing.

In this alternative embodiment the polymeric gelling agent is polyethylene glycol having a molecular weight of 15,000 or less.

In this alternative embodiment a viscosity of the gel is adjusted by changing the concentration of the gelling agent or the molecular weight of the gelling agent or both.

In this alternative embodiment the buffering system can be a phosphate or carbonate-based buffer.

In this alternative embodiment the reference electrolyte salt comprises potassium chloride with a concentration from 0.01 M to saturation or lithium acetate with a concentration from 0.01 M to saturation.

In this alternative embodiment the gelling agent concentration comprises approximately 2 to 90 wt. %.

In this alternative embodiment the components of the gel are biocompatible.

In this alternative embodiment the polymeric gelling agent comprises polyethylene glycol derivatives such as methoxypolyethylene glycol and poly(ethylene glycol) methyl ether methacrylate.

DETAILED DESCRIPTION

Figure 1:
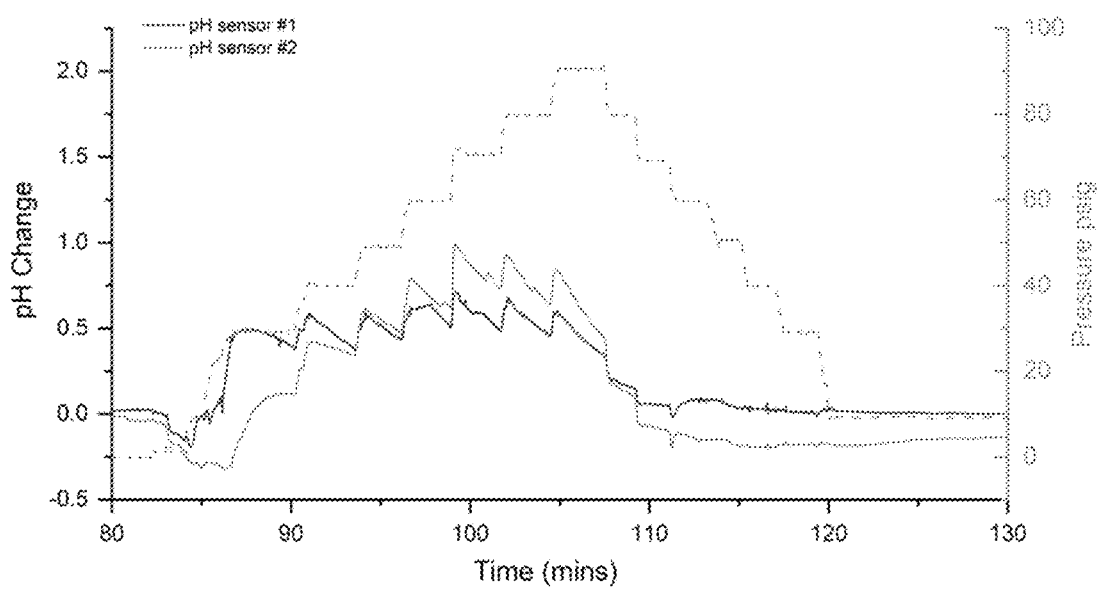
FIG. 1 is a graphical view of pressure sensitivity of prior art sensors.

This application describes a viscous, biocompatible reference gel that retains its physical and chemical properties after Gamma irradiation. Retaining its high viscosity, the reference gel can significantly reduce or eliminate undesired sensor response fluctuations when the sensor is exposed to process pressure. The new reference gel of this disclosure is especially suitable for single-use pH sensor products designed for hygienic process with process pressure variation.

For the gel to provide a solution to the problems associated with prior art gels, the gel of this disclosure is made of biocompatible components, has a stable yet adjustable viscosity, a stable and adjustable pH and is stable under gamma irradiation without undergoing significant physical and chemical changes.

Preferably, the reference gel of this disclosure comprises following four major chemical components with all of the components being biocompatible.

1. Water which functions as a solvent.
2. A reference electrolyte salt that provides a stable and sample independent liquid junction potential at the reference junction. When the reference electrode is constructed as a single-junction configuration, the salt also determines the reference electrode potential that is coupled with an Ag/AgCl wire. A suitable salt can be potassium chloride with a concentration from 0.01 M to saturation. When the reference electrode is constructed as a multi-junction configuration, this salt can also be other suitable salts such as lithium acetate.
3. A buffering system that is used to tune the pH of the gel. Because this reference gel may come into contact with a biological process, a controllable pH is highly desirable. Common buffering systems used in biotechnology are suitable for this purpose, as long as they remain stable under Gamma irradiation without significant change in pH. A suitable buffering system can be a phosphate-based buffer, or a carbonate-based buffer.
4. A polymeric gelling agent is used to control the viscosity of the gel, the viscosity being important to sensor performance under pressure. The viscosity of the gel can be controlled by changing the concentration and/or the molecular weight of the polymeric gelling agent, or both.

Also, the gelling agent should be stable under Gamma irradiation, so that the physical property of the gel does not change significantly. A successful gelling agent used in this disclosure can be polyethylene glycol (PEG) with a molecular weight equal or less than 15,000. Reference gels prepared with such PEG polymers will remain in liquid form after Gamma Irradiation. Gels prepared with PEG molecular weight equal or greater than 20,000 will change from a liquid form to a solid form after Gamma irradiation. Gels prepared with silica or other common gelling agents can significantly lose their viscosity after Gamma irradiation.

The gel of this disclosure can be useful in a variety of pH sensors and Oxidation-Reduction Potential (ORP) sensors whether the gel is irradiated or not.

All four components of the sensor of this disclosure are biocompatible making the sensor useful for hygienic applications, although other applications beside hygienic are contemplated and the disclosure herein should not be so restricted.

The buffering system of the gel contains a suitable pair of acid and its conjugate base such as a phosphate-based buffer, or a carbonate-based buffer. The pH of the gel can be adjusted by controlling the concentration ratio of the acid-base pair within the buffering system. For example, by changing the concentration ratio of $NaH_2PO_4$ to NaOH, the gel pH can be tuned.

The initial viscosity of the gel is between 1 cP and 10,000 cP, preferably between 10 cP and 5,000 cP, and more preferably between 10 cP and 1,000 cP, as measured by a rotational viscometer using measurement method specified in ASTM D2196. The gel viscosity can be controlled by changing the concentration and the molecular weight of the gelling agent. The higher the concentration and molecular weight, the higher the viscosity.

EXAMPLE

Several reference gel prototypes were prepared by mixing all the chemical components with water under room temperature under stirring, until all the components were fully dissolved. A typical gel contains the buffering system provided by 0.106 M of $NaH_2PO_4$ and 0.04 M of NaOH, a reference electrolyte of 1 M KCl, and a polyethylene glycol (PEG) gelling agent a molecular weight of 8,000 and concentration of 40 wt. %. After all the components were dissolved, the gel was in a liquid form with a viscosity of 122.4 cP at 22° C., as measured using ASTM D2196 method with a Brookfield DVE viscometer and LV-1 spindle. The pH of the gel was 6.805, which was measured with a two-point calibrated pH meter.

To determine Gamma-irradiation stability, the gel sample was Gamma irradiated at a dose of 55 kGy, and gel viscosity and pH value were examined after Gamma irradiation. After Gamma irradiation, the gel viscosity did not decrease but increased to 181.4 cP at 22° C., and the gel remained as a viscous liquid. The pH of the gel after Gamma irradiation was 6.692, indicating a minimal pH change of less than 0.2 pH. This demonstrates the reference gel is physically and chemically stable after Gamma irradiation. It is believed that the gel of this disclosure can withstand irradiation of up to 100 kGy without degradation.

In another example, a gel was prepared with 0.106 M of $NaH_2PO_4$ and 0.04 M of NaOH, a reference electrolyte of 1 M KCl, and a polyethylene glycol (PEG) gelling agent a molecular weight of 4,000 and concentration of 20 wt. %. The resulting initial viscosity was 12.1 cP at 22° C. with a gel pH of 6.422. After Gamma irradiation with a dose of 55 kGy, the gel viscosity was measured to be 13.4 cP at 22° C. and the gel pH was 6.381. Both gel viscosity and pH did not change significantly.

Other derivatives or possible gelling agents include but are not limited to polyethylene glycol derivatives which may include but are not limited to methoxypolyethylene glycol, and poly(ethylene glycol) methyl ether methacrylate. Although polyethylene glycol and its derivatives are specifically mentioned as the gelling agent, other polymers may be used as long as the aqueous solution of the polymer does not degrade under Gamma irradiation. Other suitable gelling agents may include but are not limited to polypropylene glycol and its derivatives and polyalkylene glycol and its derivatives.

For gels made with higher molecular weight PEG-20000, the liquid gels turned into a solid form after Gamma irradiation.

PEG molecular weight is an important factor that determines the final form of the reference gel after Gamma irradiation. For this disclosure, PEG with a molecular weight equal or less than 15,000 will result in a suitable liquid gel.

Figure 2:
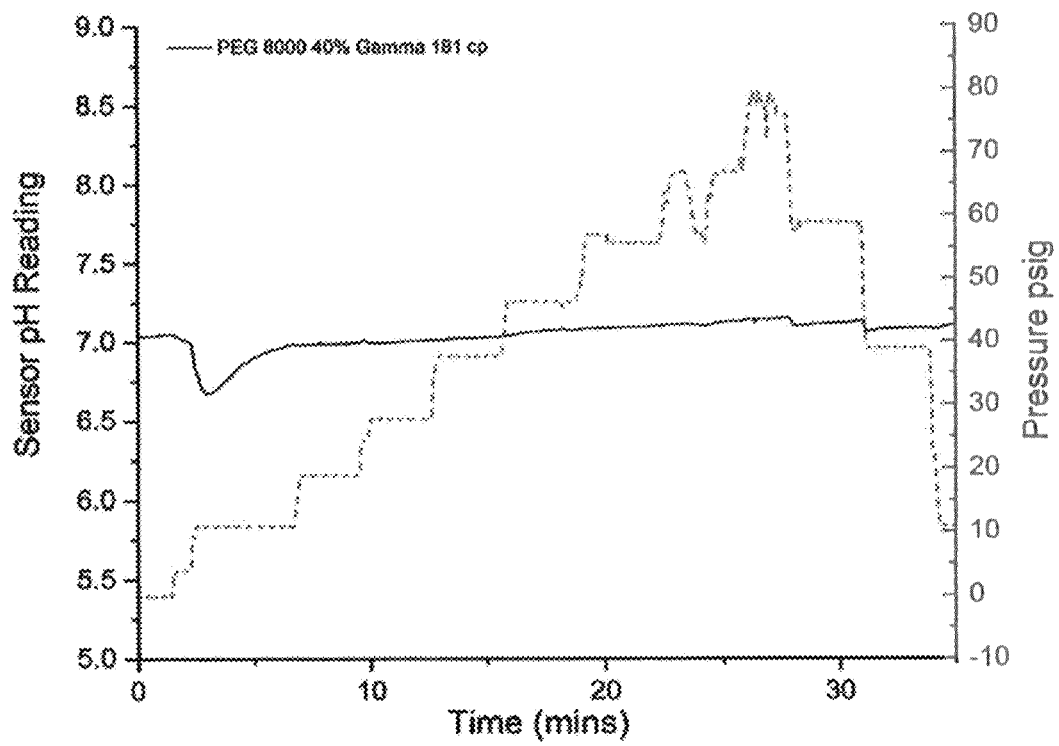
FIG. 2 is graphical view of pressure sensitivity of a sensor filled with Gamma-irradiated PEG 8000 40 wt. % reference gel.

A Gamma-irradiated PEG 8000 40 wt. % reference gel was filled into the reference chamber of a sensor body. No additional internal pressure was applied to the sensor reference electrode. The sensor was calibrated, and was exposed to external process pressure ranging from 0 to 80 psi. Process pressure is represented by a dashed line. As shown in FIG. 2, no significant pressure sensitivity was observed. This demonstrates that the reference gel of this disclosure can reduce or eliminate undesirable sensor pressure sensitivity, without requiring internal pressure within the sensor reference electrode. When this reference gel is used in combination with pressurized sensor reference electrode, it may reduce the minimum required pressure to be applied to the sensor internal reference electrode.

What is claimed is:

1. A gel for use in a pH or an ORP sensor, components of the gel comprising water, a reference electrolyte salt, a buffering system for adjusting pH of the gel, and a polymeric gelling agent that controls a viscosity of the gel wherein the viscosity is dependent on concentration and/or molecular weight of the polymeric gelling agent, or both, wherein the gel does not degrade under gamma irradiation, and wherein the polymeric gelling agent is polyethylene glycol having a molecular weight (Mw) of 15,000 or less.

2. The gel of claim 1 wherein the buffering system comprises a phosphate or carbonate-based buffer.

3. The gel of claim 1 wherein the reference electrolyte salt comprises potassium chloride with a concentration from 0.01 M to saturation or lithium acetate with a concentration from 0.01 M to saturation.

4. The gel of claim 1 wherein the polymeric gelling agent concentration comprises approximately 2 to 90 wt. %.

5. The gel of claim 1 wherein the components of the gel are biocompatible.

6. A pH sensor comprising a housing and a gel within the housing, the gel comprising a reference electrolyte salt, a buffering system for adjusting pH of the gel, and a polymeric gelling agent that controls the viscosity of the gel wherein the viscosity is dependent on concentration and/or molecular weight of the polymeric gelling agent, or both, wherein the gel does not degrade under gamma irradiation, and wherein the polymeric gelling agent is polyethylene glycol having a molecular weight (Mw) of 15,000 or less.

7. The pH sensor of claim 6 wherein the buffering system comprises a phosphate or carbonate-based buffer.

8. The pH sensor of claim 6 wherein the reference electrolyte salt comprises potassium chloride with a concentration from 0.01 M to saturation or lithium acetate with a concentration from 0.01 M to saturation.

9. The pH sensor of claim 6 wherein the polymeric gelling agent concentration comprises approximately 2 to 90 wt. %.

10. The pH sensor of claim 6 wherein the components of the gel are biocompatible.

* * * * *